United States Patent
Blume et al.

(10) Patent No.: US 8,004,149 B2
(45) Date of Patent: Aug. 23, 2011

(54) ELECTROMECHANICAL MOTOR, ESPECIALLY A PIEZOELECTRIC MICROSTEPPER DRIVE

(76) Inventors: Heinrich-Jochen Blume, Darmstadt (DE); Bernhard Gottlieb, München (DE); Andreas Kappel, Brunnthal (DE); Robert Wolfgang Kissel, Egelsbach (DE); Karl-Heinz Mittenbühler, Griesheim (DE); Tim Schwebel, München (DE); Carsten Wallenhauer, Schwarzheide (DE)

( * ) Notice: Subject to any disclaimer, the term of this patent is extended or adjusted under 35 U.S.C. 154(b) by 0 days.

(21) Appl. No.: 12/600,787

(22) PCT Filed: Apr. 23, 2008

(86) PCT No.: PCT/EP2008/054909
§ 371 (c)(1),
(2), (4) Date: Jun. 10, 2010

(87) PCT Pub. No.: WO2008/141886
PCT Pub. Date: Nov. 27, 2008

(65) Prior Publication Data
US 2010/0295418 A1    Nov. 25, 2010

(30) Foreign Application Priority Data
May 18, 2007 (DE) .................. 10 2007 023 217

(51) Int. Cl.
*H01L 41/04* (2006.01)
(52) U.S. Cl. ................... 310/323.02; 310/328
(58) Field of Classification Search ............. 310/323.02, 310/328
See application file for complete search history.

(56) References Cited

U.S. PATENT DOCUMENTS

| | | | | |
|---|---|---|---|---|
| 4,782,262 A | * | 11/1988 | Kiyo-Oka | 310/323.02 |
| 4,888,515 A | * | 12/1989 | Tamura | 310/323.02 |
| 5,079,471 A | | 1/1992 | Nygren | |
| 5,705,878 A | | 1/1998 | Lewis et al. | |
| 6,664,710 B1 | * | 12/2003 | Gottlieb et al. | 310/323.02 |
| 2005/0140317 A1 | | 6/2005 | Keine | |

FOREIGN PATENT DOCUMENTS

| | | |
|---|---|---|
| DE | 37 21 682 A1 | 4/1988 |
| DE | 100 10 392 B4 | 11/2000 |
| DE | 103 22 836 A1 | 12/2004 |
| DE | 3719362 | 11/2006 |
| EP | 1098429 | 5/2001 |
| WO | WO-9720354 | 6/1997 |

OTHER PUBLICATIONS

Qing Yao et al., "Design, analysis, fabrication and testing of parallel-kinematicmicropositioning XY stage", Machine Tools & Manufacture, vol. 47, p. 946-961, (2007).

* cited by examiner

*Primary Examiner* — Mark Budd
(74) *Attorney, Agent, or Firm* — Cozen O'Connor

(57) ABSTRACT

A motor which includes two drive elements, especially piezoelectric bending actuators, having effective directions that are perpendicular to each other. These actuators act upon a drive ring to thereby rotate a shaft. Two tension-compression bars, which are parallel to an effective direction, are connected to the drive ring, have respective joints at their ends and are connected to the ends of a diagonal bar, relative to which the ring can be displaced in the other effective direction. The diagonal bar itself can be displaced relative to fixing elements to an effective direction via a diagonal suspension. The drive is compact, having actuators that are non-radially hinged to the ring.

19 Claims, 6 Drawing Sheets

ELECTROMECHANICAL MOTOR, ESPECIALLY A PIEZOELECTRIC MICROSTEPPER DRIVE

PRIORITY CLAIM

This is a U.S. national stage of application No. PCT/EP2008/054909, filed on Apr. 23, 2008, which claims Priority to the German Application No.: 10 2007 023 217.0, filed: May 18, 2007, the contents of both being incorporated herein by reference.

BACKGROUND OF THE INVENTION

1. Field of the Invention

The present invention relates to an electromechanical motor, especially a piezoelectric actuating drive.

2. Prior Art

The cockpit of a motor vehicle attempts to achieve an optimum interplay of design and technology. Various pointer instruments are located within the field of view of the driver. These pointer instruments must both meet different technical requirements and have a competitive price for the mass production of motor vehicles. The "Messwerk 2000" by the company Siemens VDO is an example of such a pointer instrument.

The "Messwerk 2000" is based on a four-pole stepper motor drive geared down by means of a single-stage worm gear drive. The four-pole stepper motor is driven by two sinusoidal coil current variations, phase shifted to one another by 90° in phase angle, as a function of time. The sign of the phase shift determines the direction of rotation and the frequency determines the speed of rotation of the motor shaft. Within one full period of 360° of the sinusoidal current variations, up to 128 intermediate stages can be set in a reproducible manner. The utilization of these intermediate stages is called microstepper operation.

A complete "Messwerk 2000" actuating drive containing the stepper motor characterized above consists of 12 single parts. The stepper motor itself is composed of two coils with a common stator plate and a permanent-magnet rotor. With regard to the component costs, the coils and permanent magnet account for most of the costs. Apart from the material costs, the production costs are also decisive for the price which increase approximately proportionally to the number of components of the actuating drive.

In EP 1 098 429 B1, an electromechanical motor operating without rotating coils, is known in which, during the operation, a drive ring is displaced whilst rotating by an operation, offset in time, of at least two electromechanical drive elements so that, by a direct transfer of force from the drive ring to the shaft, which, in particular, is located within the drive ring, the shaft is rotated. The rotating displacement movements of the drive ring can be produced by an actuator which, e.g., is driven piezoelectrically, magnetostrictively, electrostrictively or electrodynamically, so that an actuating drive which is better suited for mass production with regard to material costs and production costs is obtained. The piezoelectric actuators are attached to the drive ring in such a manner that their respective displacement acts radially on the drive ring in which context, if necessary, other measures are also taken to achieve an introduction of force on the drive ring which is as symmetric as possible.

Although the technical circumstances mentioned last result in a drive optimized with regard to function, having the best constant-velocity characteristics (constancy of rotational speed independently of the instantaneous position of the shaft) without torque fluctuations, the longitudinal extent and the radial arrangement of the bending actuators entail that the planar drive variants require considerable space in the plane and in most cases are not very compact. However, compact planar drives are urgently needed due to the very narrow installation space conditions given in cockpit instruments.

SUMMARY OF THE INVENTION

An object of the present invention is to provide a stepper drive optimized with regard to the number of parts, production expenditure, requirement of installation space and functionality, especially a microactuating drive for meter movements of cockpit instruments.

This object is achieved by an electromechanical motor, especially a piezoelectric microstepper motor The electromechanical stepper drive according to the invention has the following features.

Two electromechanical, preferably piezoelectric, drive elements (actuators) which exhibit effective directions aligned approximately perpendicularly to one another, and a shaft supported rotatably in a drive ring such that the drive ring is excited by a deflection of the piezoelectric drive elements into the respective effective direction to perform a displacement movement which can be transmitted directly to the shaft, such that the shaft rolls in the drive ring and as a result rotates. Furthermore, the drive ring is linked by means of two tension-compression rods, which are parallel to one another and to one of the two effective directions and which in each case exhibit a hinge toward the two ends, to the ends of a diagonal bar so that the drive ring can be displaced relative to the diagonal bar in the form of a shearing in the other effective direction, that is to say the one perpendicular to the two tension-compression rods. In addition, the diametrically opposite ends of the diagonal bar extending obliquely to the two effective directions at least section by section are in each case linked by a tension-compression rod that is parallel to the other effective direction, which rod has in each case a hinge toward its two ends, to in each case one fixing element, the fixing element of the one rod and the joint of the other rod to the diagonal bar—and conversely—are in each case opposite one another approximately along a parallel to the one effective direction so that the diagonal bar can be displaced in the one effective direction relative to the fixing elements. The ring suspension according to the invention combines a parallel suspension (which at least partially frames the drive ring) for the one of the two effective directions with a diagonal suspension for the other effective direction which is perpendicular to the first one, and due to the specific articulated linking of its elements or parts relative to one another provides for the desired kinematics. As a consequence of the structure of the linkage of the drive ring to the diagonal bar in combination with the structure of the linkage of the diagonal bar to a housing or parts connected thereto in a mechanically stiff manner, the drive ring is displaceable relative to the housing in the x-y plane almost free from forces in each direction but is torsionally rigidly supported. The entire structure is here called tangential kinematics. The stringently planar structure of the ring suspension according to the invention or x-y kinematics, respectively, which can dispense with elements to be arranged in parallel with the plane of the drive ring such as, for example, spacers, is considered to be particularly noteworthy.

Any torque applied to the drive ring is transferred to the housing by the tangential kinematics without the ring being significantly rotated. Consequently, in contrast to the prior art, it is no longer necessary to pay attention to the radial force introduction of the forces provided by the bending actuators into the drive ring with respect to the center point of the annular hole since the torque caused by the non-radial eccentric force introduction onto the drive ring is absorbed essentially without torsion by the tangential kinematics and the housing. This opens up the possibility of a space-saving arrangement of the drive elements, especially along the sides or halves of the drive ring, that is to say, for example, in parallel with two sides, arranged at right angles, of a drive ring which is rectangular (toward the outside). This makes it possible to achieve a very compact installation-space-saving structure of the stepper drive. The stepper drive according to the invention is also characterized by a very low number of simple components so that it is especially suitable for mass production. Furthermore, a thermal detuning of the drive occurring due to different thermal expansion of plastic and actuator is constructionally reliably absorbed. Due to positive locking, e.g. by means of a toothing formed between drive ring and shaft, a very high actuating accuracy of the drive according to one embodiment of the invention is achieved in purely controlled operation without having to use sensors and a closed loop.

According to one embodiment of the invention to optimize compactness it is not attempted to achieve a symmetric application of force to the drive ring. The consequences possibly resulting from this with regard to the function, e.g. slight constant-velocity and torque fluctuations, can be reduced by further measures to such an extent that the customer's specifications are still adhered to. In particular, small rotational speed fluctuations (deviations from the set point) can be compensated for by driving the drive elements in a way modulating the pure sinusoidal variation.

In a particularly advantageous embodiment of the invention, the hinges of the tension-compression rods of the ring suspension are constructed as a flexure hinges. The flexure hinges can in each case be formed by a tapering of the cross section of the tension-compression rods in a short section which is of advantage especially with respect to production.

With a view to the geometric implementation of the tangential kinematics, it is advantageous to arrange the tension-compression rods arranged in parallel with the one effective direction along opposite sides or halves of the drive ring and to link them in each case to a reinforcement of the drive ring which is arranged at a side or half of the drive ring facing away from the diagonal bar. In this context, it is also advantageous to select the length of the tension-compression rod arranged between drive ring and diagonal bar in parallel with the other effective direction to be smaller than the distance between the two tension-compression rods arranged in parallel with the one effective direction. An advantageous geometric arrangement with regard to the diagonal bar can be achieved in that the diagonal bar consists of a center piece arranged approximately in parallel with the other effective direction and of end sections which are angled away toward the center piece, the end sections being angled away in the same sense of rotation so that the ends of the diagonal bar are approximately diametrically opposite one another.

It is also geometrically advantageous, that is to say essentially with regard to production, to secure the fixing element which links the tension-compression rod arranged in parallel with the other effective direction, extending along the side of the diagonal bar facing away from the drive ring, to an approximately rectangular, mechanically stiff frame part. In this embodiment, the frame part is preferably constructed as a housing part of the stepper drive. With regard to the other fixing element which links the tension-compression rod arranged in parallel with the other effective direction, extending along the side of the diagonal bar facing toward the drive ring, integration in a floor element and/or lid of a housing of the stepper drive is advantageous, the end of the tension-compression rod provided for linkage to the fixing element being provided with an end piece linked to the fixing element. Accordingly, the end piece establishes in a simple manner a localized connection, which does not break through the essentially planar structure of the ring suspension, between the plane of the drive ring and the lid or floor element of a housing.

The two electromechanical drive elements can be constructed especially advantageously as bending actuators, preferably piezoelectric bending actuators.

Such solid-state bending actuators based on piezoelectric ceramic materials have been variously used in industry in different types of design for many years. They are distinguished by a small design, a low energy demand and high reliability. Thus, for example, a piezoelectric bending actuator has a service life of at least $10^9$ cycles in an industrial environment. The bending actuators used in a microactuating drive for, for example, pointer instruments are typically dimensioned in such a manner that they have a free deflection within a range of approx. 0.2 mm to 2 mm at their moving end. In addition, a blocking force within a range of from 0.5 N to 2 N is achieved in the case of a blockage of the deflection of the freely moving end of the bending actuator. The approximately straight-line deflection of the bending actuator is in each case transverse with respect to its greatest longitudinal extent. The direction of deflection corresponding to the effective direction of the bending actuator is thus approximately orthogonal to the longitudinal axis of the bending actuator.

A particularly compact variant of the stepper drive according to the invention is obtained by an arrangement in which in each case a tension-compression rod arranged in parallel with the one or, respectively, other effective direction, extending along one side or half of the drive ring, is linked to the reinforcements on the drive ring, which tension-compression rod exhibits toward its two ends in each case a flexure hinge and to the end of which, which faces away from the reinforcement is coupled in each case to the moving end of a bending actuator, arranged perpendicularly to the respective tension-compression rod, extending along one side or—in the case of a drive ring which is not constructed to be rectangular—along one half of the drive ring. This shear-flexible hinging of the two electromechanical, preferably piezoelectric drive elements to the drive ring results in the advantage that their directions of movement are decoupled from one another so that the drive elements do not impede one another in their movement, or to a negligibly low extent. Thus, no power losses occur in the application of force. In addition, the arrangement or hinging of the bending actuators in accordance with the present embodiment is greatly space-saving. According to a development of the embodiments with bending actuators, it is advantageous to construct housing parts, the drive ring, the tension-compression rods and the diagonal bar as a drive module fabricated in one piece in plastic injection-molding technique, the bending actuators also being injected into the drive module. Implementing the drive module in plastic injection-molding technique is simple and cost effective, including the bending actuators in the injection molding process reducing the number of production steps even further.

To support the drive module stiffly and to support the associated shaft rotatably, respectively, it is advantageous to provide an approximately cuboidal housing with a floor element and a lid, a central bearing block with a support surface and with a first bearing hole being provided in the floor element and a second bearing hole for the shaft being provided in the lid and the fixing elements being arranged in the housing and secured or integrated there in such a manner that the at least one cylindrical rolling area of the shaft can roll in an associated rolling area of an annular bore of the drive ring.

BRIEF DESCRIPTION OF THE DRAWINGS

The preferred embodiments of the present invention will be explained in greater detail with reference to the accompanying drawing, in which.

DETAILED DESCRIPTION OF THE DRAWINGS

Figure 2A:
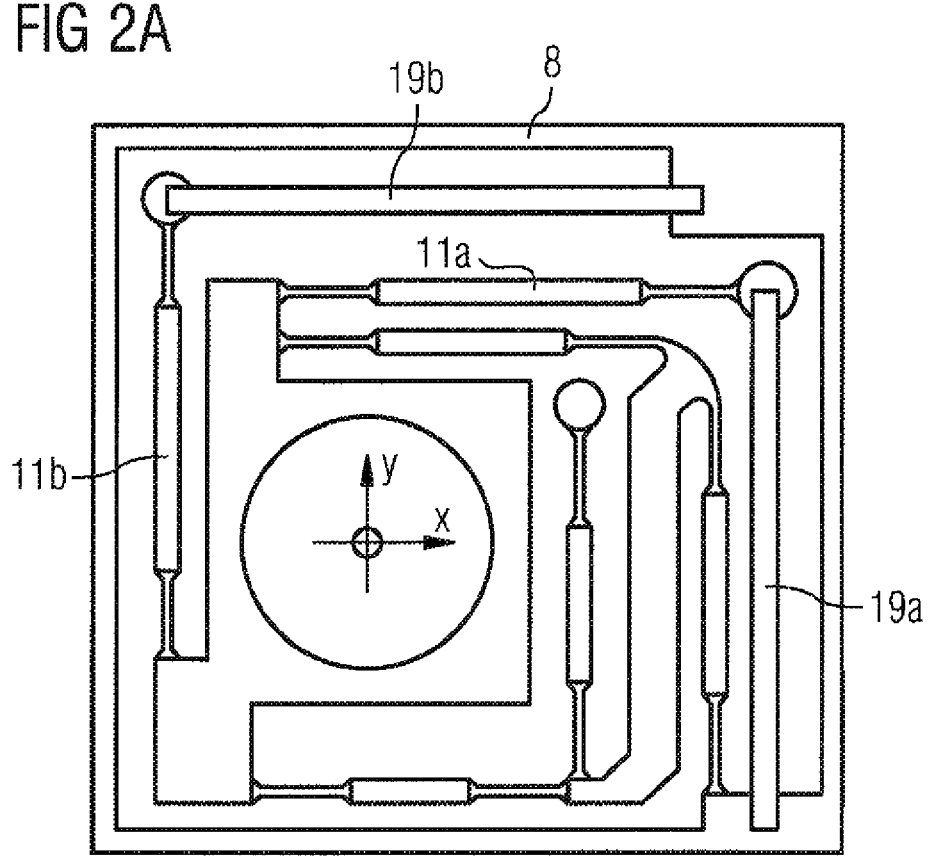
FIGS. 2A and 2B are, views to FIG. 1, with inserted bending actuators.

According to one embodiment of the invention, a piezoelectric stepper motor is presented which allows a continuous and uniform rotation to be generated by superimposing suitable periodic linear movements of bending actuators. For this purpose, the bending actuators 19a, 19b, shown in FIG. 2A, are coupled to a ring suspension ensuring displaceability in the x-y plane, in which the tangential kinematics according to the invention are implemented, in such a manner that the drive ring can be translated along the mutually perpendicular effective directions x and y of the bending actuators 19a, 19b (shown in FIG. 2). The unit formed essentially from the fixing element 12 (which can be integrated in the frame part 8) together with the drive ring 1, the diagonal bar 4, the tension-compression rods 3a, 3b, 6a, 6b, 11a, 11b and, if necessary, the integrated bending actuators 19a, 19b will be called "drive module" in the text which follows. The drive module can be produced of polyethylene, injection-molded plastic, POM or of other suitable materials with the aid of an injection-molding technique.

Figure 1A:
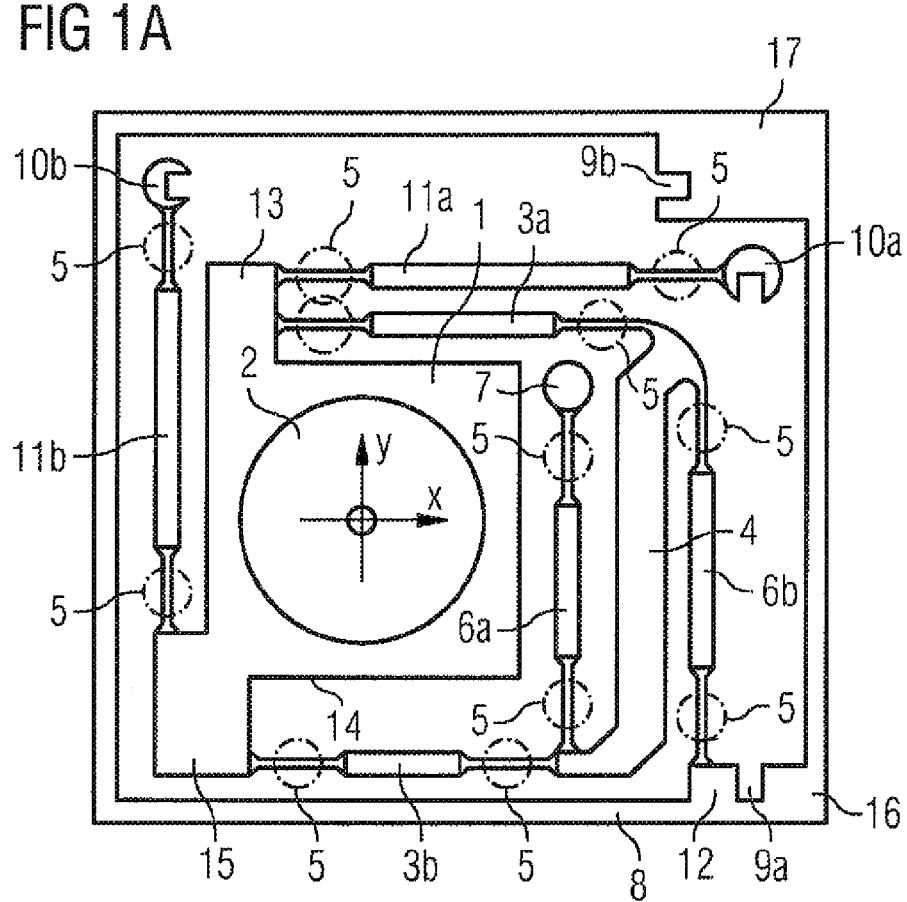
FIGS. 1A and 1B are an embodiment of a drive module, fixed in a housing frame, for the stepper drive according to the invention, a top view (FIG. 1A) and a perspective view (FIG. 1B)
Figure 1B:
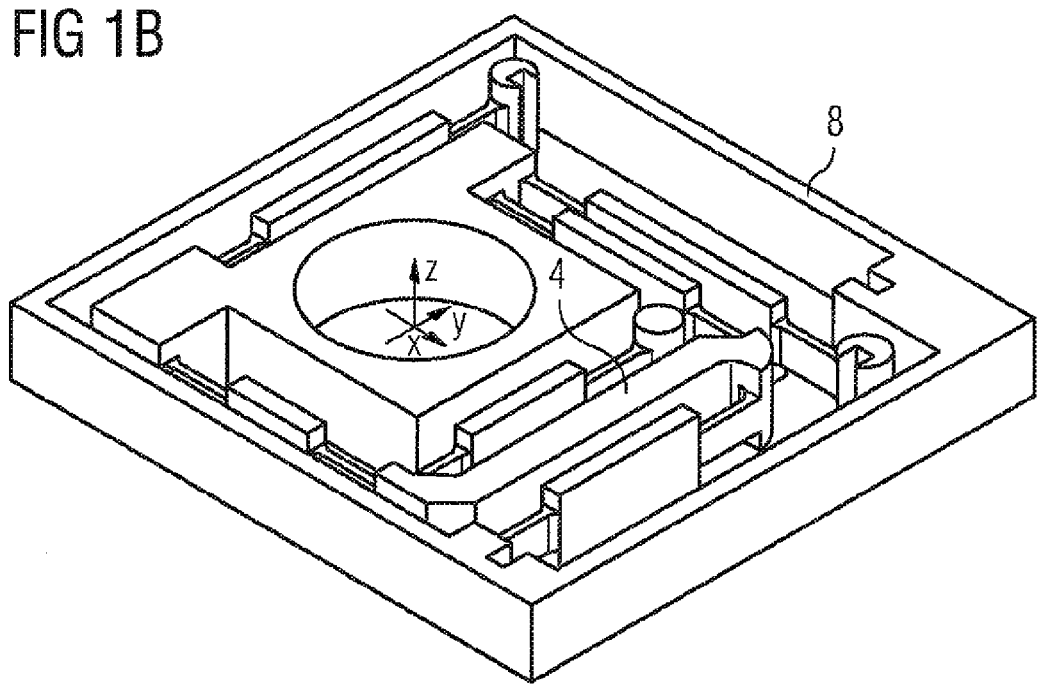

FIG. 1 shows the essentially planar and therefore easily producible structure of the drive module in a top view (FIG. 1A) and in the perspective (FIG. 1B). Firstly, it consists of a drive ring 1 which contains a cylindrical annular bore 2, the axis of which, coincides with the z axis of a Cartesian coordinate system, the x-y plane of which extends in parallel with the plane of the sheet. The drive ring 1 is constructed, for example, rectangularly and aligned with its (outer) edges or sides 14 in parallel with the two mutually perpendicular effective directions of the drive elements 19a, 19b. The drive ring 1 is connected by means of two tension-compression rods 3a, 3b extending approximately in parallel with one another and aligned in parallel with the x direction in their longitudinal extent, to a mechanically sufficiently diagonal bar 4. The tension-compression rods 3a, 3b are linked to the drive ring 1 and to the diagonal bar 4 by means of so-called flexure hinges 5. Like normal hinges, flexure hinges provide for an almost unimpeded rotation of the connected elements relative to one another (but only within a limited angular range but free of play). Their operation is based on the bending principle. The local bending is achieved by a selective reduction of the rod cross section in a short section. The reduced rod cross section leads to a greatly reduced flexure stiffness. Since the cross-sectional tapering is greatly localized, however, the axial spring rate (stiffness) of the rod is scarcely reduced. The cross-sectional tapering can occur in the (sheet) plane and/or also as wasting perpendicularly to the plane of the sheet. The geometric design of the flexure hinges with regard to axial stiffness and torsional stiffness and the degree of localization and its influence on the operation and producability of the actuating drive can still be optimized with regard to the respective application, for example with the aid of finite element models.

The arrangement of the rod elements 3a, 3b, extending paired approximately in parallel with one another and in parallel with the x axis, in combination with their linkage to the mechanically sufficiently stiff drive ring 1 and to the mechanically sufficiently stiff diagonal bar 4, by flexure hinges 5, has the consequence that the drive ring 1 can be displaced relative to the diagonal bar 4 in the form of shearing in the y direction relatively easily (i.e. almost free from forces). However, this structure opposes a torsion of the drive ring 1 and a displacement of the ring in the x direction relative to the diagonal bar 4 with a very high resistance.

The two diametrically opposite ends of the diagonal bar 4 are connected to the housing of the stepper drive by two tension-compression rods 6a, 6b extending approximately parallel with one another and aligned approximately in parallel with the y direction in their longitudinal extent. In the case of the rod 6a, the linking to the housing occurs, for example, via an end piece 7, extending partially perpendicularly to the rod 6a, of the rod 6a which is rigidly connected to a bottom element and/or lid element, not shown here, of a housing in a mechanically sufficiently rigidly non-positive or positive manner e.g. by pressing together, pinning together, welding, gluing etc. The rod 6b is connected at its end facing away from the linkage to the diagonal bar 4 to a frame part 8. The frame part 8 can be an integral component of a housing (shown below in FIG. 8) or be connected to the latter in a sufficiently rigid manner. The mechanically stiff tension-compression rods 6a, 6b are also linked to the frame part 8, the end piece 7 or, respectively, to the diagonal bar 4 via flexure hinges 5.

The mutually paired and approximately parallel arrangement with respect to the y axis of the rod elements 6a, 6b, the joints of the rods 6a, 6b being located at opposite ends of the diagonal bar 4 and the linking of a rod to the housing (or a component rigidly connected thereto) ending up approximately at the same height (y coordinate) as the linkage of the other rod to the diagonal bar 4, and the rod elements 6a, 6b being linked at all four ends by means of flexure hinges 5, has the consequence that the diagonal bar 4 can be displaced without significant resistance (i.e. almost free from forces) relative to the housing in the x direction. This structure opposes a torsion of the diagonal bar 4 and a displacement of the diagonal bar in the y direction relative to the housing with a very high resistance.

As a consequence of the structure of linking the drive ring 1 to the diagonal bar 4 in combination with the structure of linking the diagonal bar 4 to the housing or parts which are mechanically rigidly connected thereto (e.g. endpiece 7, frame part 8), the drive ring 1 can be displaced in any direction almost free from forces relative to the housing in the x-y plane, but is torsionally rigidly supported. Any torque engaging the drive ring 1 is transferred to the housing by the tangential kinematics according to the invention without the ring being significantly rotated during this process. The deflections caused in the ring suspension move within a range of only approximately. 100 micrometers.

In this exemplary embodiment, the frame part 8, at the same time, forms a part of the drive housing and, if necessary, can have reinforcements 16, 17 (e.g. in the corners and edges). The frame part 8 can be used for securing the actuating drive, particularly the fixing element 12 and is therefore assumed to be spatially fixed. As can also be seen from FIG. 1, the reinforcements 16 and 17 of the frame part 8 contain receptacles 9a, 9b, respectively, for the torsionally rigid securing of strip-shaped electromechanical, preferably piezoelectric bending actuators. In the frame element 8, measures, not shown here, can be provided in order to electrically contact the bending actuators at their end resting (in the frame part 8) (e.g. pressure contact pins, clip contacts, yoke spring contacts etc.). As an alternative, the bending actuators can also be connected electrically in the moving area or at their opposite moving end, respectively. To accommodate the moving ends of the bending actuators to be inserted with their resting ends into the receptacles 9a, 9b of the frame part 8, suitable receiving bodies 10a, 10b are provided which are each secured to the drive ring 1 via a sequence consisting of a flexure hinge 5, a rigid tension-compression rod 11a, 11b and a further flexure hinge 5.

Figure 2B:
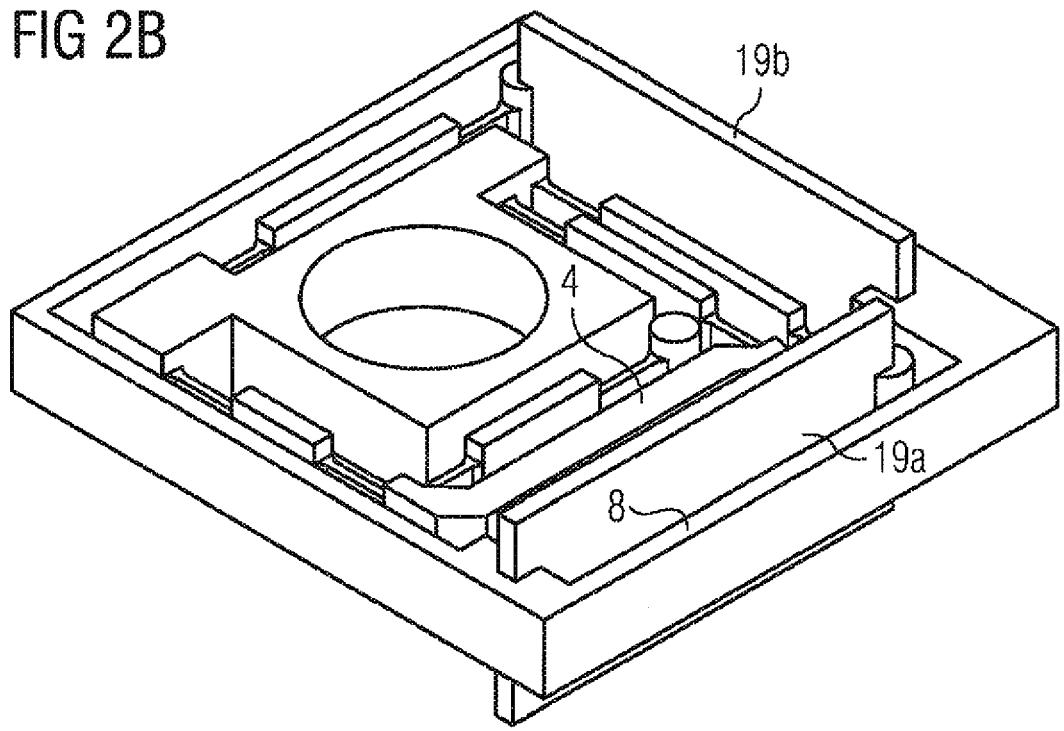

FIG. 2 shows the drive module with inserted solid-state bending actuators 19a, 19b which, in the text which follows, will only be called actuator in brief. In the exemplary configuration shown, the actuators 19a, 19b are secured mechanically rigidly in the frame part 8 at their resting end and arranged approximately orthogonally to one another. The stiffness of the linking of the actuators 19a, 19b to the frame part 8 can be increased by reinforcements 16, 17 of the frame part 8. If an actuator 19a, 19b is electrically activated, it performs a bending movement, its moving end essentially performing a movement perpendicularly to its longitudinal extent. The direction of movement of the actuators 19a, 19b is also called effective direction.

The bending actuator 19a, when electrically activated, therefore deflects in the x direction or generates a force in the x direction in the case of resistance. This movement or force is transferred mechanically rigidly to the rigid drive ring 1 by the tension-compression rod 11a. When electrically activated, the bending actuator 19b deflects in the y direction or, respectively generates a force in the y direction in the case of resistance. This movement or force is transferred mechanically rigidly to the rigid drive ring 1 by the tension-compression rod 11b. Linking the tension-compression rods 11a, 11b to the receiving bodies 10a, 10b and beyond that to the drive ring 1 by means of flexure hinges 5 has the effect that the bending actuators 19a, 19b act completely independently of one another and cannot influence one another mutually. The actuators thus in particular do not need to work against the comparatively high mechanical stiffness of the respective other bending actuator. The movements of the bending actuators 19a, 19b are thus decoupled.

If a bending actuator is electrically activated, it bends approximately in the form of a circular arc as a result of which the slope of the tangent of the bending line at the moving end of the bending actuator changes. This type of "rotational movement" is reliably absorbed by the flexure hinges 5. Similarly, a change in the bending length relative to the drive module (caused e.g. by different thermal expansion of the materials of the tangential kinematics, of the housing and of the bending actuators 19a, 19b) is reliably absorbed by the tension-compression rod coupling 11a, 11b with flexure hinges 5 in that the rods 11a, 11b are rotated minimally without this appreciably impairing their force or travel transfer function.

Figure 3A:
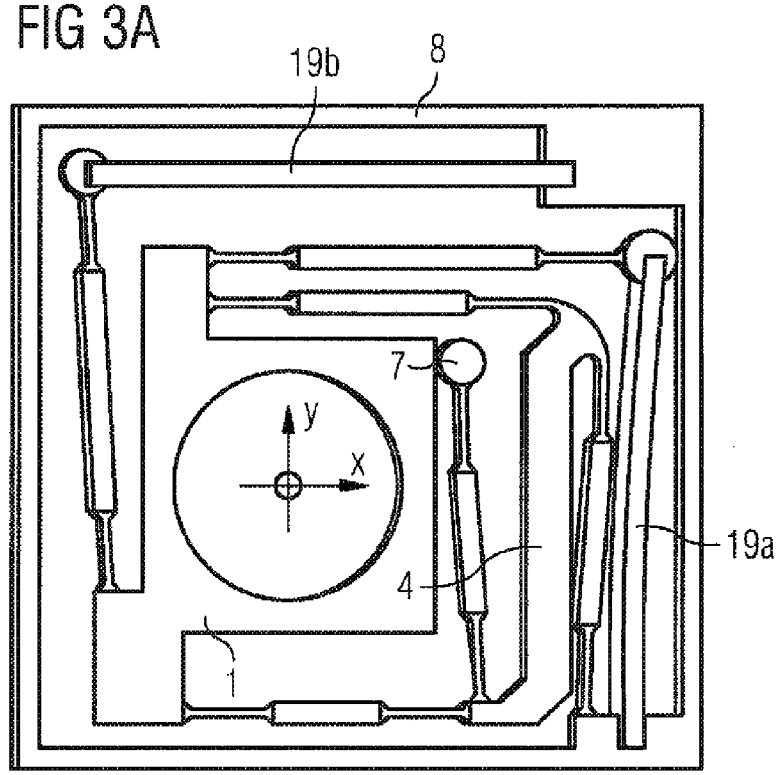
FIG. 3A is a top view of a drive module with a drive ring hinged in the x direction and FIG. 3B shows a top view of a drive module with a drive ring hinged in the y direction.

FIG. 3A shows the reaction (deformation) of the tangential kinematics when the bending actuator 19a is activated to perform a deflection in parallel with the positive x direction. The diagonal bar 4 is displaced in the positive x direction by the tension-compression rods 3a, 3b. The result to be noted is that the drive ring 1 immediately follows the x movement of the moving end of the actuator 19a without twisting, the structure of the suspension of the diagonal bar 4 ensuring the necessary guidance and flexibility. An alternative embodiment would also be possible in which the ends of the diagonal bar 4 are diametrically opposite from "top left" to "bottom right", that is to say the reverse of the exemplary embodiments shown in FIGS. 1 to 8.

Figure 3B:
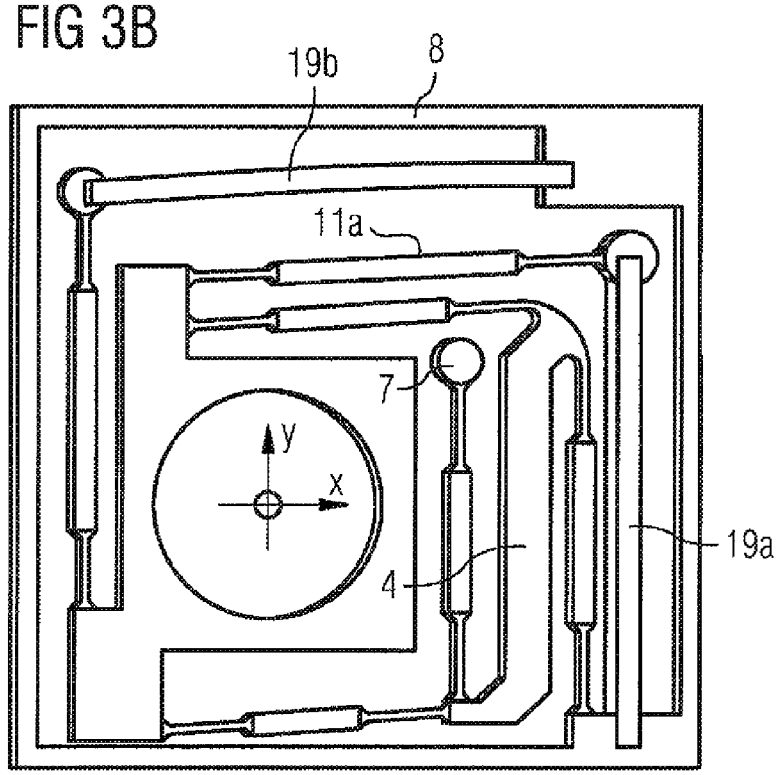

FIG. 3B shows the reaction (deformation) of the tangential kinematics when the bending actuator 19b is activated to perform a deflection in parallel with the negative y direction. The result to be noted is that the drive ring 1 immediately follows the y movement of the moving end of the actuator 19b without twisting, the structure of the suspension of the ring 1 at the diagonal bar 4 ensuring the guidance and flexibility necessary for this.

Overall, the bending actuators 19a and 19b move the drive ring 1 completely independently of one another in the x and y direction, respectively, relative to the housing. Ring torsion is prevented by the tangential kinematics. The result is a very compact and stringently planar structure of the drive module with a very small number of simple components. The drive module is therefore also amenable to production. For example, the drive module can be implemented in a simple and cost-effective manner in plastic injection molding technique and the bending actuators 19a, 19b can be particularly advantageously also injected into the drive module in one cycle, which reduces further the number of production steps. For the rest, the structure of linking the bending actuators 19a, 19b to the drive ring 1 absorbs relative changes in length of the elements with respect to one another (e.g. due to different thermal expansion of the materials used).

To implement the tangential kinematics principle associated with the drive module in a stepper motor, a shaft and a support thereof which is as free of play as possible but rotatable, and a stiff support of the drive module are also required.

Figure 4A:
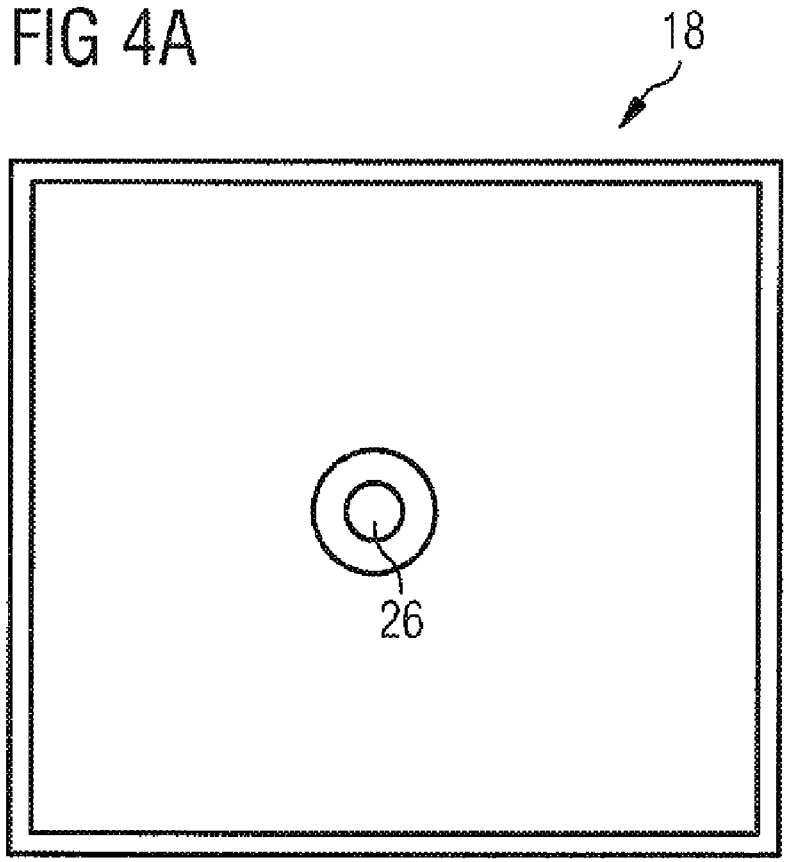
FIGS. 4A and 4B are, corresponding views to FIG. 1, a housing floor element for supporting the shaft and the drive module.
Figure 4B:
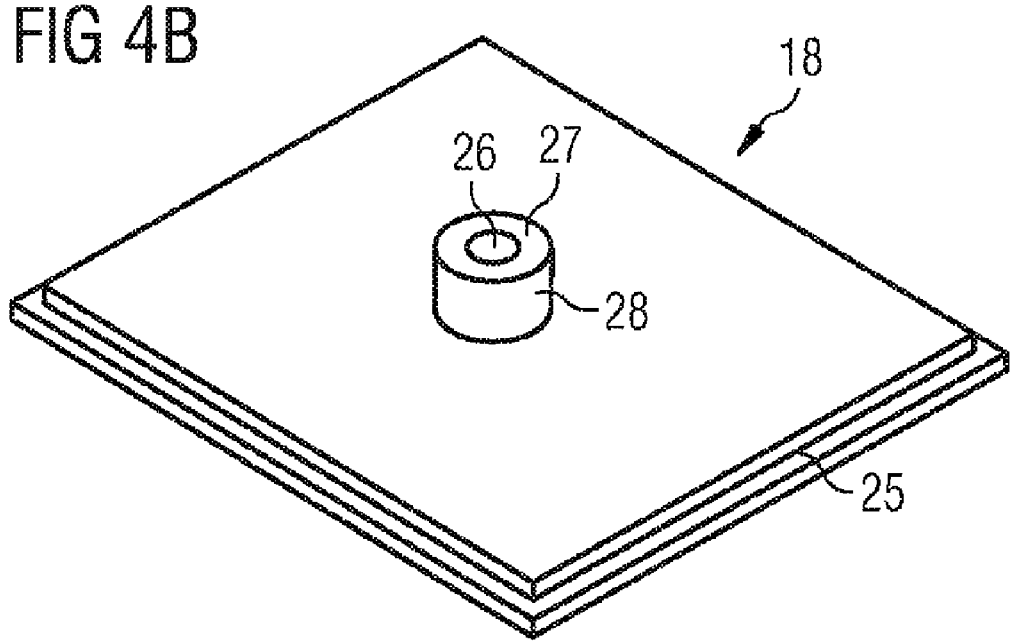

FIG. 4 is a floor element 18 suitable for this in conjunction with the housing frame 8. It contains a peripheral groove 25 paired with a peripheral edge of the frame part of the drive module, which, when the floor element 18 is inserted into the drive module, ensures that the bore axis of a bearing bore 26 comes to lie congruently with the axis of the annular bore 2 of the ring 1. The diameter of the bearing bore 26 is paired with a cylindrical sliding surface for the shaft 39, compare FIG. 8, which, together, form a first rotary bearing, which is free of play but of low friction for the shaft 39. The front face 27 of the central bearing block 28 is used as support surface for the shaft 39 so that a rolling area of the shaft 39 comes to lie at the same height as the annular bore 2.

Figure 5A:
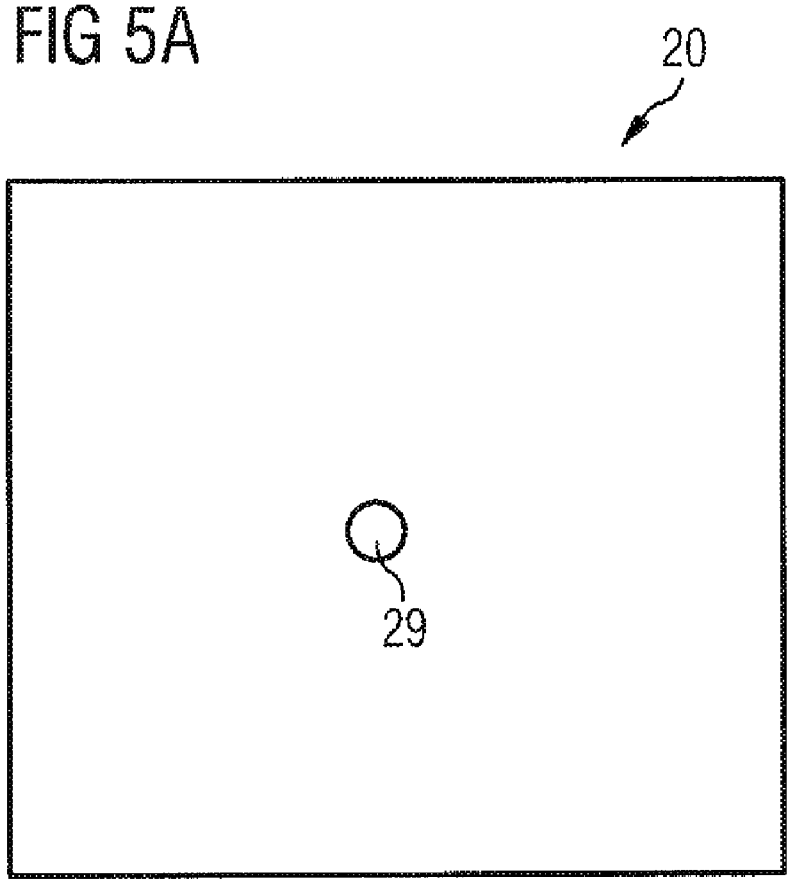
FIGS. 5A and 5B are corresponding views to FIG. 1, a lid fitting the housing according to FIGS. 1 and 4, respectively.
Figure 5B:
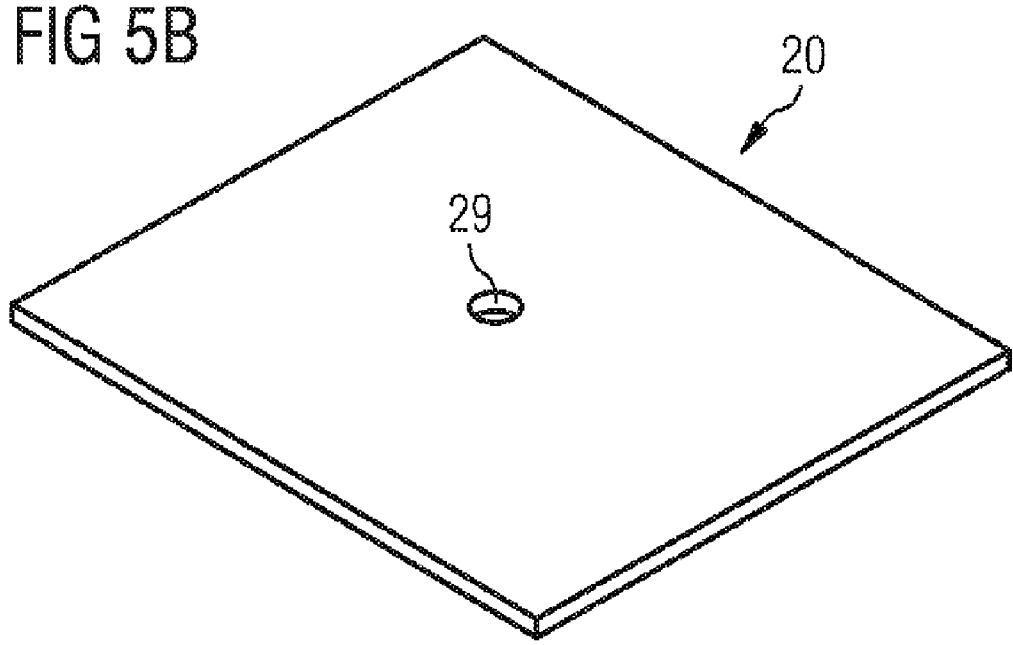

FIG. 5 is the lid 20 fitting the housing frame 8 and floor element 18, which also has on its underside a peripheral groove which is paired with a peripheral edge of the frame part 8 of the drive module so that, when the lid 20 is inserted into the drive module, the axis of a bearing bore 29 comes to lie congruently with the axis of the annular bore 2. The diameter of the bearing bore 29 is paired with a second cylindrical sliding surface for the shaft 39 which, together, form a second rotary bearing, which is free of play but of low friction, for the shaft 39, compare FIGS. 7 and 8.

Figure 6A:
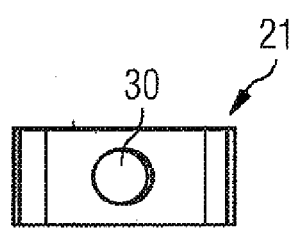
FIGS. 6A and 6B are, corresponding views to FIG. 1, a view of a yoke spring.
Figure 6B:
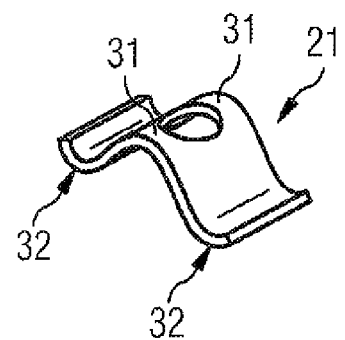

FIG. 6 is a suitable yoke spring 21. It contains a hole 30 for passing the shaft axle, which ensures that it cannot 'migrate' in operation. The yoke spring 21 is supported on the shaft 39 via areas 31 close to the axis of the hole in the form of a contact line in order to keep any braking torque generated by friction on the shaft 39 as small as possible. The lower surfaces 32 located far outside are used for supporting the yoke spring 21 on a lid surface. The force of the yoke spring 21 is dimensioned adequately for keeping the shaft 39 reliably at rest on the front face 27 of the bearing block 28 of the floor element 18 in all operating states, but is also kept as small as possible in order to prevent significant friction forces which would impede the rotation of the shaft 39. This ensures that the rolling areas of drive ring 1 and shaft 39 remain localized with respect to one another sufficiently accurately in the z direction under all operating conditions.

Figure 7A:
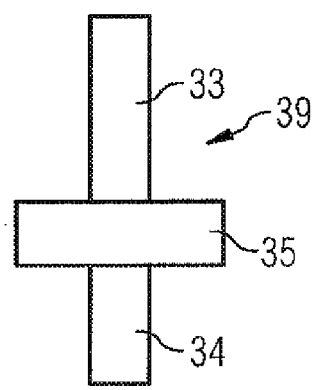
FIGS. 7A and 7B are, corresponding views to FIG. 1, a shaft for the stepper drive according to the invention.
Figure 7B:
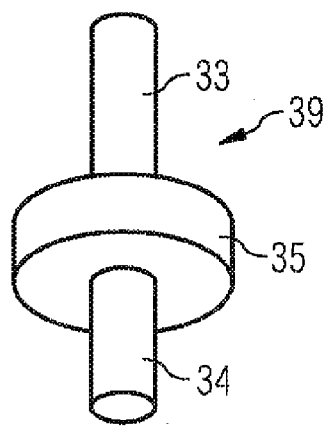

FIG. 7 is a suitable shaft 39. It has two cylindrical sliding bearing surfaces 33, 34 which are paired with the cylindrical inner surfaces of the bearing bores 29, 26, and at least one cylindrical rolling area 35 which is paired with at least one rolling area 105 of the annular bore 2 of the drive ring 1. The axial extension of the surface 33 is used for connecting the respective element to be driven by the stepper motor to the shaft 39.

Figure 8:
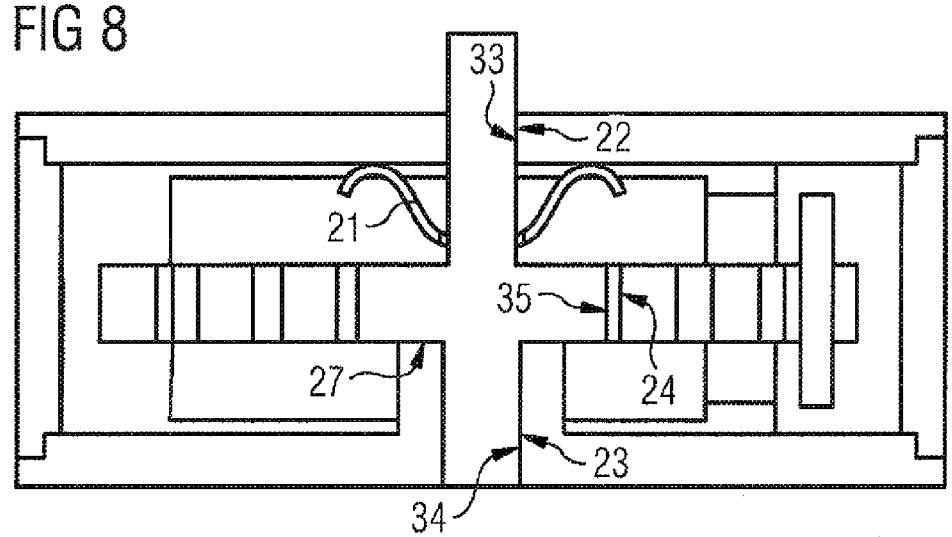
FIG. 8 is an axial cross section along the z axis through the drive in its housing in the assembled state.

FIG. 8 shows an axial cross section along the z axis through the drive in the assembled state. In particular, it shows the position of its components with respect to one another. The shaft 39 can be rotated with low friction around the z axis at two places in the form of narrow clearances by means of the sliding-surface pairs 33, 22 and 34, 23 but is supported mechanically rigidly with respect to translation. A suitable yoke spring 21, in interaction with the support surface 27, keeps the shaft 39 fixed in a low-friction manner with respect to the z direction. In a state of rest, the drive module keeps the rolling area 24 of the annular bore 2 both concentrically and in the z direction in a suitable position relative to the rolling area 35 of the shaft 39.

With the aid of suitable electrical activating functions, the bending actuators 19a, 19b in each case perform at their moving end deflections with a sinusoidal or cosinusoidal variation in time around the rest position, as a result of which the rolling area 24 of the annular bore 2 is kept to rest against the rolling area 35 of the shaft 39 and is moved around the rolling area 35 of the shaft 39 in the form of a circular displacement movement and, as a result, rotates the shaft 39. The direction of rotation is established by means of the relative phase angle of the x and y deflections of the drive ring 1, respectively and the speed of rotation is established with the aid of the control frequency.

In the simplest case, force is transmitted from the drive ring 1 to the shaft 39 by friction. In this context, slippage can occur in dependence on the load torque acting on the shaft 39, of an actuating drive constructed in this manner, which reduces the accuracy of the actuating drive. The slippage is preferably reduced by the introduction of a positive fit between the rolling areas of drive ring 1 and shaft 39, especially by applying a toothing to the inner surface 24 of the drive ring 1 and to the outer surface 35 of the shaft 39. In this arrangement, the drive ring 1 and the shaft 39 preferably exhibit a tooth difference of at least 1. This means that the toothing of the inner surface 24 of the drive ring 1 comprises at least one tooth more than the outer surface 35 of the shaft 39. If drive ring 1 and shaft 39 are operated within the actuating drive in such a manner that the toothing does not drop out of engagement, the actuating drive ideally works free of slippage.

A cycloidal toothing of drive ring 1 and shaft 39 is considered to be especially preferred. In the case of the cycloidal toothing, almost one half of all teeth is engaged as a result of which a high torque can be transferred between drive ring 1 and shaft 39. The number of teeth located on the inner surface 24 of the drive ring 1 and the outer surface 35 of the shaft 39 initially establishes a gearing-down of the actuating drive which is typically within a range of 20:1 to 200:1. To set the actuating drive further by only one tooth, that is to say to rotate the shaft 39 by one tooth further by means of the drive ring 1, a complete period of the driving sinusoidal signal of the actuator drive must be preferably passed. Since it is necessary to pass through one cycle of the drive signal for advancing by one tooth, the actuating drive is distinguished by high accuracy and by a high repetition accuracy. In addition, the number of teeth and the utilization of one cycle of the drive signal per tooth makes it possible to achieve a high angular resolution of the actuating drive. In addition to this, it is possible to interpolate arbitrarily within one period of the drive signal in order to ensure a microstepper operation of the actuating drive. The actuating drive according to preferred designs thus supplies a high efficiency, high gearing-down, a high transferrable torque based on the toothing of drive ring 1 and shaft 39, freedom from slippage during the transmission of the torque, arbitrary interpolation of the angle of rotation within one tooth of the shaft 39 (microstepper operation), low drive torque fluctuations (ripple) and a low loading on tooth flanks for drive ring 1 and shaft 39 so that the wear is also reduced.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An electromechanical motor, comprising:
two electromechanical drive elements configured to move in respective effective drive directions substantially perpendicularly to one another;
a drive ring configured to be activated by a deflection of the electomechanical drive elements resulting in a displacement movement of the drive ring;
a shaft rotatably supported in a drive ring and configured such that the displacement movement of the drive ring is transmitted to the shaft, whereby the shaft rotates;
a diagonal bar having first and second opposite ends,
first and second tension-compression rods arranged parallel to one another and parallel to one of the two effective drive directions, each of the two tension-compression rods comprising a hinge at each end of the tension-compression rod, the first tension-compression rod coupled between the first end of the diagonal bar and the drive ring, the second tension-compression rod coupled between the second end of the diagonal bar and the drive ring, wherein the drive ring is displaceable in the form of a shearing relative to the diagonal bar;

third and fourth tension-compression rods arranged parallel to one another, perpendicular to the first and second tension-compression rods, and parallel to the other of the two effective drive directions, the third and fourth tension-compression rod comprising a hinge at each end of the tension-compression rod, the third and fourth tension-compression rods being connected between the opposite ends of the diagonal bar and a respective fixing element, wherein the diagonal bar is displaceable relative to the fixing elements.

2. The electromechanical motor as claimed in claim 1, wherein the hinges of the tension-compression rods are constructed as flexure hinges.

3. The electromechanical motor as claimed in claim 2, wherein a cross-sectional tapering in a short section of the tension-compression rods forms the flexure hinges.

4. The electromechanical motor as claimed in claim 1, wherein the first and second tension-compression rods are arranged along opposite sides of the drive ring and are in each linked to a reinforcement of the drive ring, the reinforcement of the drive ring arranged at a side of the drive ring opposite the diagonal bar.

5. The electromechanical motor as claimed in claim 4, wherein a length of one of the third and fourth tension-compression rod is smaller than a distance between the first and second tension-compression rods.

6. The electromechanical motor as claimed in claim 1, wherein the diagonal bar comprises a center piece arranged approximately in parallel with the other of the effective drive direction, and two end sections which are angled away toward the center piece, the end sections being angled away with the same sense of rotation so that the ends of the diagonal bar are approximately diametrically opposite one another.

7. The electromechanical motor as claimed in claim 1, wherein the fixing element is secured to a mechanically rigid frame part.

8. The electromechanical motor as claimed in claim 7, wherein the frame part is a housing part of the motor.

9. The electromechanical motor as claimed in claim 1, wherein
at least one of the respective fixing elements is one of integrated in a bottom element of a housing and lid of the housing of the stepper drive, and
one of the third and fourth tension-compression rods comprising an end piece for fixing the end of the tension-compression rod opposite the diagonal bar.

10. The electromechanical motor as claimed in 1, wherein the two electromechanical drive elements are bending actuators.

11. The electromechanical motor as claimed in claim 10, further comprising fifth and sixth tension-compression rods each having a flexure hinge at each of its two ends and each being arranged perpendicular to the bending actuator to which it is coupled at a respective first end, wherein each of the fifth and sixth tension-compression rods is linked at its respective second end to a respective reinforcement on the drive ring.

12. The electromechanical motor as claimed in claim 11, wherein at least a frame part, the drive ring, the tension-compression rods, and the diagonal bar form a drive module fabricated in one piece by plastic injection-molding, the bending actuators also being injected into the drive module.

13. The electromechanical motor as claimed in claim 1, further comprising:

an approximately cubic housing with a floor element a central bearing block with a support surface and with a first bearing bore being provided in the floor element; and a lid configured to mate with the housing comprising a second bearing bore provided in the lid, wherein the fixing element is arranged in the housing and one of secured and integrated therein such that at least one cylindrical rolling area of the shaft is configured to roll in an associated rolling area of an annular bore of the drive ring.

14. The electromechanical motor as claimed in claim 13, wherein the shaft comprises a disk-shaped centerpiece, a first annular front face of the disk-shaped centerpiece rests on the bearing block and the outer surface area of which forms the cylindrical rolling area of the shaft.

15. The electromechanical motor as claimed in claim 14, further comprising a yoke spring configured to fix of the shaft in the z direction, the yoke spring comprising a hole configured to pass the shaft, the yoke spring supported on:
a second annular front face of the disk-shaped centerpiece of the shaft opposite the first annular front face of the disk-shaped centerpiece and,
an area of the lid in such that the rotation of the shaft is not significantly impeded.

16. The electromechanical motor as claimed in claim 13, wherein, for transmission of force to the rolling area of the annular bore and to the associated rolling area of the shaft a toothing is arranged on each of the respective rolling areas.

17. The electromechanical motor as claimed in claim 1, wherein the electromechanical motor is a piezoelectric microstepper drive.

18. The electromechanical motor as claimed in 10, wherein the two electromechanical drive elements are piezoelectric bending actuators.

19. The electromechanical motor as claimed in claim 16, wherein, the toothing is a cycloidal toothing.

* * * * *